United States Patent [19]

Dabby et al.

[11] 4,232,938
[45] Nov. 11, 1980

[54] TELECOMMUNICATION SYSTEMS USING OPTICAL WAVEGUIDES

[75] Inventors: Franklin W. Dabby, Woodbridge; Ronald B. Chesler, Cheshire, both of Conn.

[73] Assignee: Times Fiber Communications, Inc., Wallingford, Conn.

[21] Appl. No.: 949,032

[22] Filed: Oct. 6, 1978

[51] Int. Cl.³ .................................................. G02B 5/14
[52] U.S. Cl. .............................. 350/96.20; 350/96.30; 350/96.33
[58] Field of Search ............... 350/96.20, 96.29, 96.30, 350/96.33

[56] References Cited

U.S. PATENT DOCUMENTS

| 3,434,776 | 3/1969 | Kern | 350/96.30 |
| 3,756,688 | 9/1973 | Hudson | 350/96.33 |
| 4,076,375 | 2/1978 | Muska | 350/96.29 |

*Primary Examiner*—Stewart J. Levy
*Attorney, Agent, or Firm*—Bacon & Thomas

[57] ABSTRACT

A method for transmitting light signals through optical waveguides is disclosed. The method comprises passing light emitted from a source of light, such as a laser, through a plurality of individual, longitudinally connected optical waveguides having progressively greater core diameters. Telecommunications systems for implementing the method are also disclosed.

16 Claims, 1 Drawing Figure

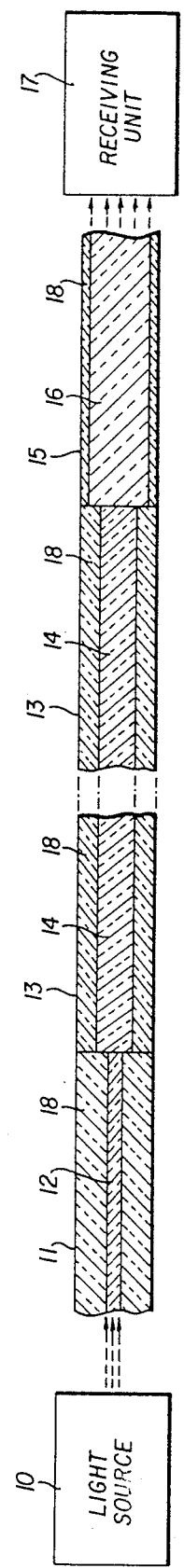

TELECOMMUNICATION SYSTEMS USING OPTICAL WAVEGUIDES

BACKGROUND OF THE INVENTION

1. Field of the Invention

The present invention is directed to an improved method of transmitting light signals through optical waveguides and telecommunications systems which use the method.

2. Description of the Prior Art

The use of optical waveguides in telecommunications systems has become increasingly prevalent during the past several years. In brief, optical waveguides are extremely thin, flexible glass fibers, prepared by drawing glass preforms under controlled conditions. Although these conditions are subject to wide variation depending upon such factors as the composition of the glass and the drawing procedure, the optical waveguide so prepared will comprise, in its simplest form, a glass core of a given, constant diameter, surrounded by a glass cladding having an index of refraction less than that of the glass core. The cladding acts as a barrier which confines attenuation of the light traveling to the core.

Thus, depending upon the specific physical and chemical properties of the waveguide, light signals may be transmitted through the core of the fiber with only minimal attenuation of light.

However, attenuation poses a far greater problem when two optical waveguides are connected. Such connections are inevitable in any telecommunication system. To minimize this problem, connectors for optical waveguides have been developed. These devices attempt to precisely align the two waveguides so that the axis of the transmitting waveguide is coincident with the axis of the receiving waveguide and the ends of each waveguide are precisely adjacent to one another. Unfortunately, even with the use of such connectors, attenuation at the connection interface of the waveguides occurs.

SUMMARY OF THE INVENTION

Accordingly, it is a primary object of the present invention to provide a method for transmitting light signals through a plurality of optical waveguides which minimizes attenuation at connection points between two waveguides.

Another object of the invention is to provide a telecommunication system for transmitting light signals through optical waveguides with minimal attenuation due to connections in the system.

Still other objects and advantages of the invention will become apparent to those skilled in the art upon reviewing the description of the invention which follows.

The foregoing objects and advantages are accomplished by providing a method for transmitting light signals from a source of light to a receiver which comprises passing light emitted from a light source through a plurality of individual, longitudinally connected optical waveguides having progressively greater core diameters. The method is adapted for use in telecommunication systems by providing a system for transmitting light signals comprising a source of light connected to a plurality of individual, longitudinally connected optical waveguides having progressively greater core diameters which terminate in a receiver for the light signals.

BRIEF DESCRIPTION OF THE DRAWING

The FIGURE of drawing depicts a telecommunication system constructed in accordance with the present invention.

DETAILED DESCRIPTION OF THE INVENTION

The optical waveguides used in operating the method and telecommunication system of the invention are not critical, although certain types, as more fully described below, have been found to be particularly effective. Hence, any of the conventional waveguides currently available, as well as those to be developed which function in an equivalent manner, may be used in the present invention. In general, such waveguides comprise extremely thin, cylindrical fibers containing a cylindrical core of a given diameter and refractive index, and a cladding which surrounds the core and possesses an index of refraction less than that of the core. Such fibers are usually grouped into one of two categories—graded or step index fiber. Graded index fiber is comprised of a core of substantially uniform composition and refractive index and a cladding having a non-uniform, radially varying composition and correspondingly, non-uniform, radially varying indices of refraction. This type of fiber is recognized as the preferred fiber for use in optical waveguide cables since it is capable of transmitting a large range of bandwidths. On the other hand, step fiber is comprised of a core of substantially uniform composition and refractive index and a cladding of a different, substantially uniform composition and refractive index. The refractive index is, of course, less than that of the core.

The methods for preparing both graded and step index waveguides are well known to those of skill in the art, being described in numerous U.S. patents and other technical literature. In brief, these methods comprise forming a cylindrical preform, which is subsequently heat treated and drawn into fiber. By careful control of the composition of the glass in the preform, fiber is obtained which has the desired composition and refractive index. In general, the compositional variations are obtained by incorporating various dopants into the pure silica glass. Thus, dopants which increase the refractive index, such as titanium oxide, tantalum oxide, tin oxide, niobium oxide, zirconium oxide, aluminum oxide, lanthanum oxide and germanium oxide, may be incorporated in the core. Alternately, the core may be composed of pure silica and the cladding composed of silica doped with a component which decreases the refractive index, such as boron oxide.

In constructing systems for transmitting light signals through optical waveguides, a relatively short (i.e., about one meter) transmitting optical waveguide is connected to a source of light, usually a laser. The end of the waveguide is equipped with a special lens to focus the light emitted from the light source into the core of the fiber. This transmitting waveguide is connected to the main transmission line which comprises an optical waveguide cable. The optical waveguide cable may comprise one or more optical waveguides connected longitudinally, depending upon the overall length of the main transmission line. At the receiving end of the line, the optical waveguide cable is connected to a relatively short receiving waveguide which is, in turn, connected to a receiving unit such as a pin diode. To facilitate construction and maintenance of these telecommunication systems it is imperative that the optical waveguides in the system have identical outer diameters. This insures that parts may be mass produced according to uniform specifications.

The present invention modifies the foregoing conventional telecommunication system by requiring that each succeeding optical waveguide possess a greater core diameter than the transmitting waveguide to which it is connected. This arrangement reduces the amount of attenuation which occurs at the connection interfaces by increasing the cross-sectional area into which the light signals are transmitted across the interface. In this manner, light which would normally escape from the system across the interface is picked up by the expanded core area of the receiving waveguide.

Thus, according to a preferred embodiment of the invention shown in the FIGURE of drawing, there is provided a telecommunication system comprised of a source of light 10 connected to at least one transmitting optical waveguide 11 having a core 12 of diameter $d_1$ which connects the light source to at least one optical waveguide cable 13. The cable, which itself is comprised of an optical waveguide having a core 14 of diameter $d_2$ which is greater than diameter $d_1$, is the main transmission line. The cable is, in turn, connected to at least one receiving optical waveguide 15 having a core 16 of diameter $d_3$ which is greater than both $d_1$ and $d_2$. The receiving optical waveguide 15 is connected to receiving unit 17. Each optical waveguide core is surrounded by a cladding 18, which decreases in width as the core diameter in each succeeding waveguide increases, to maintain a constant, uniform outer diameter for the waveguides. In practice, the diameter $d_1$ of the core of the transmitting optical waveguide is approximately 55 microns, the diameter $d_2$ of the core of the optical waveguide cable is approximately 80 microns, the diameter $d_3$ of the core of receiving optical waveguide is approximately 110 microns and the outer diameters of all waveguides are approximately 125 microns.

It is also preferred to construct the transmitting waveguide and waveguide cable of graded index optical fiber while employing a step index fiber as the receiving optical waveguide. This is because graded optical waveguides allow maximum bandwidth transmission while step index optical waveguides exhibit greater collecting power. Thus, by constructing the telecommunication system in this manner, both bandwidth transmission and receiving efficiency is maximized.

While the present invention has been described in terms of various preferred embodiments, those of skill in the art will recognize that various additions, modifications, and omissions may be made without departing from the spirit thereof. Accordingly, it is intended that the scope of the present invention be limited solely by that of the claims which follow.

What is claimed is:

1. A method for transmitting light signals from a source of light to a receiver comprising passing light emitted from a source of light through a telecommunication system comprising at least one transmitting optical waveguide having a core of diameter $d_1$, connecting said source of light to least one optical waveguide cable comprising at least one optical waveguide having a core of diameter $d_2$ and at least one receiving optical waveguide having a core of diameter $d_3$, connecting said at least one optical waveguide cable to said receiver for light signals, wherein $d_1 < d_2 < d_3$ and wherein the outer diameters of said optical waveguides are equal.

2. The method as defined by claim 1, wherein said optical waveguides comprise a glass core for light transmission surrounded by a glass cladding, wherein the index of refraction of said glass core is greater than the index of refraction of said glass cladding.

3. The method as defined by claim 2, wherein said glass core comprises fused silica and said glass cladding comprises boron-doped silica.

4. The method as defined by claim 2, wherein said glass core comprises fused silica containing a dopant selected from the group consisting of titanium oxide, tantalum oxide, tin oxide, niobium oxide, zirconium oxide, aluminum oxide, lanthanum oxide and germanium oxide.

5. The method as defined by claim 1, wherein said transmitting optical waveguide and said optical waveguide cable comprise graded index optical fiber and said receiving optical waveguide comprises a step index optical fiber.

6. A telecommunication system for transmitting light signals from a source of light to a receiver comprising a source of light connected to a plurality of individual, longitudinally connected optical waveguides, terminating in a receiver for light signals, wherein said plurality of individual, longitudinally connected optical waveguides comprises at least one transmitting optical waveguide having a core of diameter $d_1$, connecting said source of light to at least one optical waveguide cable comprising at least one optical waveguide having a core of diameter $d_2$ and at least one receiving optical waveguide having a core of diameter $d_3$ connecting said at least one optical waveguide cable to said receiver for light signals, wherein $d_1 < d_2 < d_3$ and wherein the outer diameters of said optical waveguides are equal.

7. A telecommunication system as defined by claim 6, wherein said optical waveguides are precisely aligned at the connection interface.

8. The telecommunication system as defined by claim 6, wherein said source of light is a laser.

9. The telecommunication system as defined by claim 6, wherein said receiver is a pin diode.

10. The telecommunication system as defined by claim 6, wherein $d_1$ is approximately 55 microns.

11. The telecommunication system as defined by claim 6, wherein $d_2$ is approximately 80 microns.

12. The telecommunication system as defined by claim 6, wherein $d_3$ is approximately 110 microns.

13. The telecommunication system as defined by claim 6, wherein said optical waveguides have identical outer diameters of approximately 125 microns.

14. The telecommunication system as defined by claim 6, wherein said optical waveguides comprise a glass core surrounded by a glass cladding wherein the index of refraction of said glass core is greater than the index of refraction of said glass cladding.

15. The telecommunication system as defined by claim 6, wherein said glass core comprises fused silica and said glass cladding comprises boron-doped silica.

16. The telecommunication system as defined by claim 6, wherein said glass core comprises fused silica containing a dopant selected from the group consisting of titanium oxide, tantalum oxide, tin oxide, niobium oxide, zirconium oxide, aluminum oxide, lanthanum oxide, and germanium oxide.

* * * * *